US011561972B2

(12) United States Patent
Tran et al.

(10) Patent No.: US 11,561,972 B2
(45) Date of Patent: Jan. 24, 2023

(54) QUERY CONVERSION FOR QUERYING DISPARATE DATA SOURCES

(71) Applicant: salesforce.com, inc., San Francisco, CA (US)

(72) Inventors: Andrew Son Nhat Tran, San Mateo, CA (US); Ravishankar Arivazhagan, Belmont, CA (US); Zuye Zheng, San Francisco, CA (US); Irene Fung, New Westminster (CA); Julian Navaratnam, Vancouver (CA); Martin Desrosiers, Vancouver (CA); Saloni Shah, San Bruno, CA (US); Shaila Shree, Fremont, CA (US); Yaoyao Lin, Vancouver (CA); James Russell Diefenderfer, San Francisco, CA (US); Anirudh Sridhar, Sunnyvale, CA (US)

(73) Assignee: Salesforce, Inc., San Francisco, CA (US)

( * ) Notice: Subject to any disclaimer, the term of this patent is extended or adjusted under 35 U.S.C. 154(b) by 194 days.

(21) Appl. No.: 16/779,077

(22) Filed: Jan. 31, 2020

(65) Prior Publication Data
US 2021/0149895 A1 May 20, 2021

Related U.S. Application Data

(60) Provisional application No. 62/937,209, filed on Nov. 18, 2019.

(51) Int. Cl.
*G06F 16/00* (2019.01)
*G06F 16/2452* (2019.01)
*G06F 16/25* (2019.01)
*G06F 16/953* (2019.01)
*G06F 16/2458* (2019.01)

(52) U.S. Cl.
CPC ...... *G06F 16/2452* (2019.01); *G06F 16/2471* (2019.01); *G06F 16/252* (2019.01); *G06F 16/258* (2019.01); *G06F 16/953* (2019.01)

(58) Field of Classification Search
CPC .................................................... G06F 16/258
See application file for complete search history.

(56) References Cited

U.S. PATENT DOCUMENTS

| 2014/0236579 | A1* | 8/2014 | Kurz | G06F 16/3344 704/9 |
| 2019/0065567 | A1* | 2/2019 | Griffith | G06F 16/2445 |

* cited by examiner

*Primary Examiner* — Ajith Jacob
(74) *Attorney, Agent, or Firm* — Holland & Hart LLP

(57) ABSTRACT

Methods, systems, and devices supporting querying disparate data sources are described. Querying disparate data sources may include receiving an input for data stored at a first data source from a plurality of data sources, selecting a first data connector from a plurality of data connectors, wherein the first data connector corresponds to the first data source, and identifying a first query language corresponding to the first data source from a plurality of query languages. Querying the disparate data sources may further include generating a converted query based at least in part on the first query language and retrieving the data from the first data source using the first data connector based at least in part on the converted query.

20 Claims, 14 Drawing Sheets

QUERY CONVERSION FOR QUERYING DISPARATE DATA SOURCES

CROSS REFERENCES

The present Application for Patent claims priority to U.S. Provisional Patent Application No. 62/937,209 by Tran et al., entitled "QUERY CONVERSION FOR QUERYING DISPARATE DATA SOURCES," filed Nov. 18, 2019, assigned to the assignee hereof.

FIELD OF TECHNOLOGY

The present disclosure relates generally to database systems and data processing, and more specifically to query conversion for querying disparate data sources.

BACKGROUND

A cloud platform (i.e., a computing platform for cloud computing) may be employed by many users to store, manage, and process data using a shared network of remote servers. Users may develop applications on the cloud platform to handle the storage, management, and processing of data. In some cases, the cloud platform may utilize a multi-tenant database system. Users may access the cloud platform using various user devices (e.g., desktop computers, laptops, smartphones, tablets, or other computing systems, etc.).

In one example, the cloud platform may support customer relationship management (CRM) solutions. This may include support for sales, service, marketing, community, analytics, applications, and the Internet of Things. A user may utilize the cloud platform to help manage contacts of the user. For example, managing contacts of the user may include analyzing data, storing and preparing communications, and tracking opportunities and sales.

A user of the cloud platform may desire to analyze data from multiple sources. The data may be stored on different systems that are not connected and that utilize differing programming languages and data storage techniques. Querying the different data domains may pose multiple challenges, such as generating query forms using language specific to an application programming interface (API) for each of the different data locations, presenting the data to a user using multiple and separate user interfaces, and abiding by data residency rules specific to the data in question. In some systems, querying multiple data domains using multiple and distinct types of query forms may increase system latency and degrade user experience. In order for the user to visualize and/or analyze the data queried from third party sources, the user may utilize multiple and separate programs for the resident data and the queried third-party data. In some cases, importing data from third party sources to facilitate visualization of the data alongside data native within a single system may result in data residency concerns associated with storage of the imported data.

DETAILED DESCRIPTION

Figure 1:
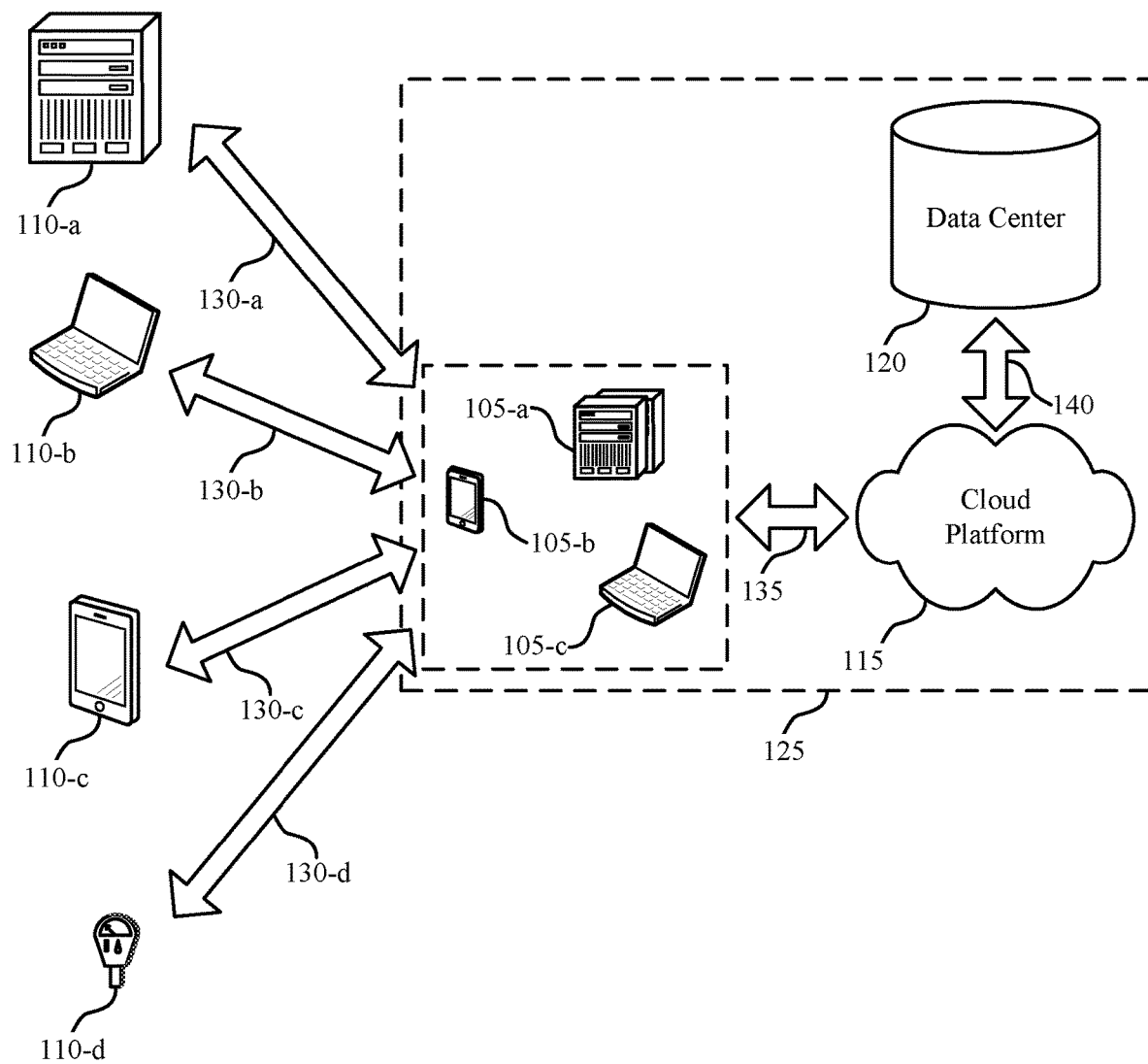
FIG. 1 illustrates an example of a system that supports query conversion for querying disparate data sources in accordance with aspects of the present disclosure.

A database system may store a plurality of data for an organization. This data may include any data related to orders, sales, employee metrics, or any other type of data relevant to the organization. One or more of the different data sources may be stored externally to the organization and may be stored as different types of data objects, in different data formats, with different data fields, and may be accessed using different types of query languages, or a combination thereof. In at least some examples, accessing data native to the organization's databases may be accomplished using a standard query form, such as a compact form, utilizing a common language, for example Salesforce analytics query language (SAQL) or Salesforce object query language (SOQL). The queried data may be analyzed and visualized by a user via a user interface (UI) configured to present the native queried data to the user in a standard format.

Additionally, at least some data of relevance to a user may be stored externally to the organization's databases. Importing the externally stored data to the organization's systems and databases may facilitate analyzation and visualization of the data within a single UI, however, storage of the data may implicate data residency rules and may represent only a snapshot of the external data as it existed at the time the external data was sampled by the system.

To efficiently and intuitively facilitate visualization and analyzation of non-native data, the database system may implement generic query processes utilizing generic query forms and connectors. The generic query forms, which may be a compact form, and related processes may present a common query input form to a user. The generic query form may be non-specific with regards to data type, data storage location, or language type associated with the external data and, in cooperation with a corresponding connector, may translate the input query into a language or format corresponding to the external data that is being queried. For example, a query may be generated by a user, using the generic query form, within the database system and directed to a dataset that is stored externally to the database system on an API. In some examples, the user may input a request for data into the generic query form via a user interface. The generic query form may convert the input query to a language specific to the external data source and may query the external data source directly or may query the external data source via a connector specific to the API associated with the external data source.

Once the generic query form has been translated into the corresponding language associated with the externally stored data, the queried externally located data may be visualized and reviewed within the database system UI alongside data native to the database system. Visualizing and analyzing the externally located data within the database system UI may facilitate improving a user experience and facilitate efficiency of data exploration by the user because the same interface and toolkits may be available to the user for both of the data stored within the database system and the externally stored data that has been queried and switching between multiple UIs to perform such actions is not required. Further, exploration of the externally stored data may be performed without the need to first import and store the externally located data, which may facilitate low-latency querying and avoid potential data residency rules and procedures.

Additionally, using the described connectors, exploration of the API associated with the external data source may facilitate exploration of the external data in real-time as a live data set. This may allow the user to view data that is current and up to date rather than viewing data that represents the state of the external data as it existed at the time the query of the external data was executed.

Aspects of the disclosure are initially described in the context of an environment supporting an on-demand database service. Aspects of the disclosure are further described with respect to an illustration of a generic query for querying disparate data sources, a system diagram, and a process flow diagram. Aspects of the disclosure are further illustrated by and described with reference to apparatus diagrams, system diagrams, and flowcharts that relate to query conversion for querying disparate data sources.

FIG. 1 illustrates an example of a system 100 for cloud computing that supports query conversion for querying disparate data sources in accordance with various aspects of the present disclosure. The system 100 includes cloud clients 105, contacts 110, cloud platform 115, and data center 120. Cloud platform 115 may be an example of a public or private cloud network. A cloud client 105 may access cloud platform 115 over network connection 135. The network may implement transfer control protocol and internet protocol (TCP/IP), such as the Internet, or may implement other network protocols. A cloud client 105 may be an example of a user device, such as a server (e.g., cloud client 105-a), a smartphone (e.g., cloud client 105-b), or a laptop (e.g., cloud client 105-c). In other examples, a cloud client 105 may be a desktop computer, a tablet, a sensor, or another computing device or system capable of generating, analyzing, transmitting, or receiving communications. In some examples, a cloud client 105 may be operated by a user that is part of a business, an enterprise, a non-profit, a startup, or any other organization type.

A cloud client 105 may interact with multiple contacts 110. The interactions 130 may include communications, opportunities, purchases, sales, or any other interaction between a cloud client 105 and a contact 110. Data may be associated with the interactions 130. A cloud client 105 may access cloud platform 115 to store, manage, and process the data associated with the interactions 130. In some cases, the cloud client 105 may have an associated security or permission level. A cloud client 105 may have access to specific applications, data, and database information within cloud platform 115 based on the associated security or permission level, and may not have access to others.

Contacts 110 may interact with the cloud client 105 in person or via phone, email, web, text messages, mail, or any other appropriate form of interaction (e.g., interactions 130-a, 130-b, 130-c, and 130-d). The interaction 130 may be a business-to-business (B2B) interaction or a business-to-consumer (B2C) interaction. A contact 110 may also be referred to as a customer, a potential customer, a lead, a client, or some other suitable terminology. In some cases, the contact 110 may be an example of a user device, such as a server (e.g., contact 110-a), a laptop (e.g., contact 110-b), a smartphone (e.g., contact 110-c), or a sensor (e.g., contact 110-d). In other cases, the contact 110 may be another computing system. In some cases, the contact 110 may be operated by a user or group of users. The user or group of users may be associated with a business, a manufacturer, or any other appropriate organization.

Cloud platform 115 may offer an on-demand database service to the cloud client 105. In some cases, cloud platform 115 may be an example of a multi-tenant database system. In this case, cloud platform 115 may serve multiple cloud clients 105 with a single instance of software. However, other types of systems may be implemented, including—but not limited to—client-server systems, mobile device systems, and mobile network systems. In some cases, cloud platform 115 may support CRM solutions. This may include support for sales, service, marketing, community, analytics, applications, and the Internet of Things. Cloud platform 115 may receive data associated with contact interactions 130 from the cloud client 105 over network connection 135, and may store and analyze the data. In some cases, cloud platform 115 may receive data directly from an interaction 130 between a contact 110 and the cloud client 105. In some cases, the cloud client 105 may develop applications to run on cloud platform 115. Cloud platform 115 may be implemented using remote servers. In some cases, the remote servers may be located at one or more data centers 120.

Data center 120 may include multiple servers. The multiple servers may be used for data storage, management, and processing. Data center 120 may receive data from cloud platform 115 via connection 140, or directly from the cloud client 105 or an interaction 130 between a contact 110 and the cloud client 105. Data center 120 may utilize multiple redundancies for security purposes. In some cases, the data stored at data center 120 may be backed up by copies of the data at a different data center (not pictured).

Subsystem 125 may include cloud clients 105, cloud platform 115, and data center 120. In some cases, data processing may occur at any of the components of subsystem 125, or at a combination of these components. In some cases, servers may perform the data processing. The servers may be a cloud client 105 or located at data center 120.

The system 100 may support query conversion for querying disparate data sources. For example, cloud clients 105 may query data external to subsystem 125, the contacts 110, the data center, or the cloud platform 115. A query may originate from cloud clients 105 or contacts 110. The system 100 may provide conversion of the query into a query corresponding to a language and format of the disparate data source and may provide for the transmission of the query to the disparate data source as well as for interaction with the disparate data source. The system 100 may provide for visualization and analysis of the data received in response to the generated converted query and may order the data into a usable view. The system 100 may present this view to a user (e.g., a cloud client 105, a contact 110, etc.) in a user interface of a user device, and the system 100 may present the data received from the disparate data source alongside data present within the system 100.

In some other systems, different applications, platforms, or databases may store data including sales data, order data, personnel data, or other metrics. In some cases, the data may be stored disparately in multiple and differing formats and may be stored in the applications, platforms, or databases using multiple and differing programming languages. In some examples, importing data from these disparate sources to a single common source may implicate data residency issues, may lead to increased system latency associated with acquiring the data, converting the data to a format and programming language common to the single common source, and may inhibit real-time analysis of the data. In some examples, querying the data may include the use of different UIs and different applications. For example, to retrieve data stored at an external database in a programming language not shared with home database, a second UI that is separate from a first UI used to interface with the home database may be used to generate a query for the data stored at the external database. Additionally, the second UI may be used to visualize and explore the external queried data. Such multiple UI and multiple query generation data exploration processes may impact the efficiency and usability of the queried data, especially for users familiar with a specific UI and the associated tools.

In contrast, the system 100 may implement query conversion for querying disparate data sources while using a single UI that facilitates analysis of results from both queries of non-disparate data sources and the disparate data sources. In some cases, query conversion for querying disparate data sources may improve user experience. For example, query conversion for querying disparate data sources may facilitate visualization and analysis of both disparate and non-disparate data sources in a single UI by a user. In some cases, query conversion of disparate data sources may provide an efficient way to query disparate data sources for real-time review of the data sources as well as efficiently querying data sources that may be stored in databases using differing programming languages.

A query conversion for querying disparate data source may include receiving a query from a user for data stored at a disparate data source. In some examples, the data may be stored on a database and in a programming language that is not shared with a non-disparate database associated with a UI through which the user is interacting with the system 100. Accordingly, the query conversion may include selecting a data connector corresponding to the disparate database such that a query generated by the query conversion may be delivered via the connector to the disparate database. Additionally, in some cases, a query language corresponding to the disparate database is selected and the input from the user is converted into a query in the identified language and the generated query is delivered to the disparate database. Data corresponding to the delivered generated query is retrieved from the disparate database via the selected data connector.

It should be appreciated by a person skilled in the art that one or more aspects of the disclosure may be implemented in a system 100 to additionally or alternatively solve other problems than those described herein. Furthermore, aspects of the disclosure may provide technical improvements to "conventional" systems or processes as described herein. However, the description and appended drawings only include example technical improvements resulting from implementing aspects of the disclosure, and accordingly do not represent all of the technical improvements provided within the scope of the claims.

Figure 2:
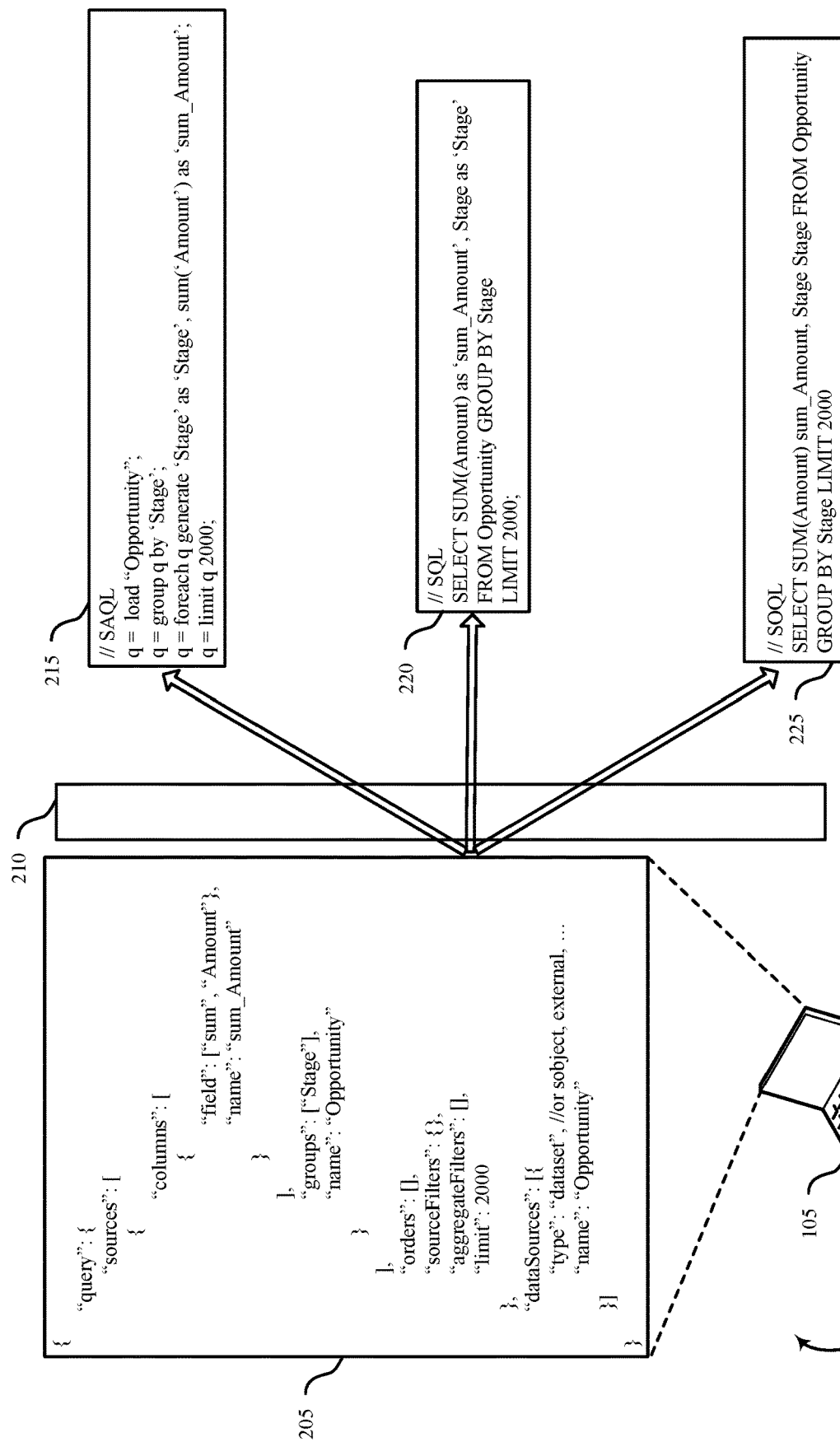
FIG. 2 illustrates an example of a generic query that supports query conversion for querying disparate data sources in accordance with aspects of the present disclosure.

FIG. 2 illustrates an example of a generic query 200 that supports query conversion for querying disparate data sources in accordance with aspects of the present disclosure. In some cases, the generic query 200 may include a compact form 205 and a plurality of generated queries that are generated by a query generation engine 210. In some cases, the compact form 205 may be a generic short form 205. In some cases, the query generation form may generate queries in one or more languages that are specific to a particular data source type (e.g., a Salesforce analytics query language (SAQL), structured query language (SQL), or salesforce object query language (SOQL)). In other examples, the query generation engine may generate additional queries in additional programming languages to facilitate querying of disparate databases.

In this example, the compact form 205 is a compact form configured to capture all input from a user. In some examples, the user may interact with the compact form 205 via a user device, such as the cloud client 105, a server (e.g., cloud client 105-*a*), a smartphone (e.g., cloud client 105-*b*), or a laptop (e.g., cloud client 105-*c*) as shown in FIG. 1. A user may input a request for data stored at a data source and this input request may be received at the database system.

In this example, the query generation engine 210 receives the compact form 205 and determines or receives a destination for the query based on the information input by the user and contained within the compact form 205. Based on the determined destination for the query, the query generation engine generates queries in a programming language corresponding to the native programming language of the data to which the query is directed. For example, if the query is determined to be directed at data contained within a non-external database system, for example data center 120, and the programming language used by the database containing the data to be queried is SAQL, the query generation engine 210 may generate a SAQL query 215. The query generation engine 210 may run locally at the client device 105 (e.g., within a browser running on the client device 105).

In some examples, if the query is determined to be directed at data that is external to the database system and the query generation engine 210 determines that the programming language of the external data is SQL, the query generation engine 210 may generate an SQL query 220. Additionally, in this example, based on the determination of the native programming language used by the database where the data to be queried is located, the query generation engine 210 may generate an SOQL query 225. In additional examples, the query generation engine 210 may convert the information received from the compact form 205 into any programming language that corresponds to a language used by a storage location of a dataset to which the query is to be directed.

Figure 3:
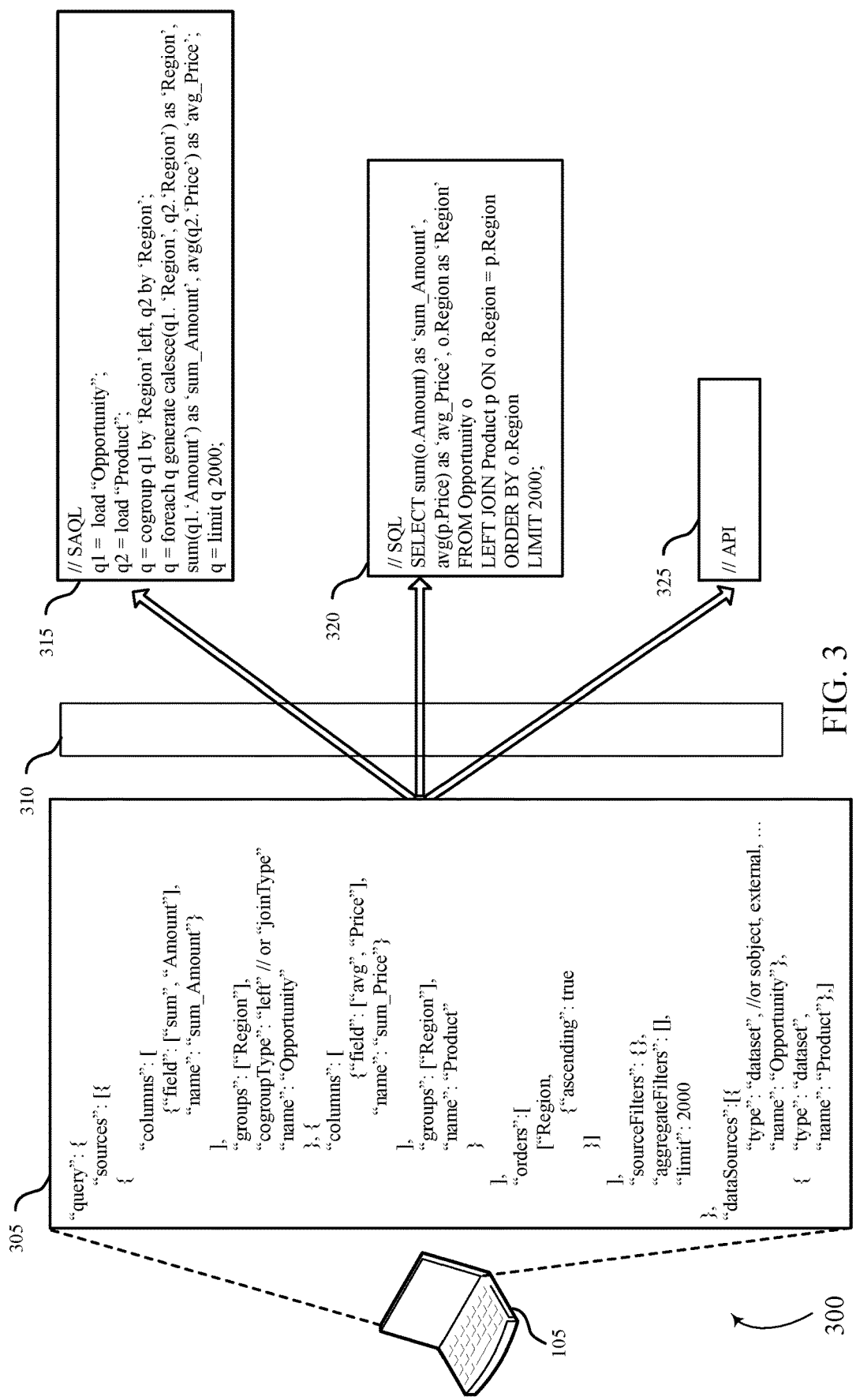
FIG. 3 illustrates an example of a multiple source generic query that supports query conversion for querying disparate data sources in accordance with aspects of the present disclosure.

FIG. 3 illustrates an example of a multiple source generic query 300 that supports query conversion for querying multiple disparate data sources in accordance with aspects of the present disclosure. In some cases, the multiple source generic query 300 may include a multiple source compact form 305 and a plurality of generated queries that are generated by a query generation engine 310. In some cases, the query generation form may generate queries in one or more languages that are specific to one or more particular data source types (e.g., a Salesforce analytics query language (SAQL) or structured query language (SQL)) or an application programming interface (API). In other examples, the query generation engine may generate additional queries in additional programming languages to facilitate querying of one or more disparate databases.

In this example, the multiple source compact form 305 is a compact form configured to capture all input from a user. In some examples, the user may interact with the multiple source compact form 305 via a user device, such as the cloud client 105, a server (e.g., cloud client 105-*a*), a smartphone (e.g., cloud client 105-*b*), or a laptop (e.g., cloud client 105-*c*) as shown in FIG. 1. A user may input a request for data stored at one or more data sources and this input request may be received at the database system for processing by the multiple source generic query 300. The multiple source generic query 300 may detect the type of the one or more data sources based on the input request by the user at the user device and may present the user with multiple source compact form 305 capabilities based on the input request. For example, based on the input request by the user, the multiple source compact form 305 that the user may interact with via the user device may present only the query-building options available to interact with the data sources associated with the input request.

In this example, the query generation engine 310 receives the multiple source compact form 305 following entry of the input request by the user and determines or receives one or more destinations for the one or more queries based on the information input by the user and contained within the multiple source compact form 305. Based on the determined one or more destinations for the one or more queries, the query generation engine generates the one or more queries in a programming language corresponding to the native programming language or environment of the data to which each of the one or more queries is directed. For example, if one or more of the queries is determined to be directed at data contained within a non-external database system, for example data center 120, and the programming language used by the database containing the data to be queried is SAQL, the query generation engine 310 may generate a SAQL query 315 for each of the one or more queries directed at the data contained by the SAQL-using database. In another example, if one or more of the queries is determined to be directed at data contained within an external database containing data accessible via an API, the query generation engine 310 may generate an API query 325 for each of the one or more queries directed at the data contained by the database that is accessible via the API. The query generation engine 310 may run locally at the client device 105 (e.g., within a browser running on the client device 105).

In some examples, if the query is determined to be directed at data that is external to the database system and the query generation engine 310 determines that the programming language of the external data is SQL, the query generation engine 310 may generate an SQL query 320. In additional examples, the query generation engine 310 may convert the information received from the multiple source compact form 305 into any programming language that corresponds to a language used by a storage location of a dataset or environment in which the dataset is stored to which the query is to be directed.

Figure 4:
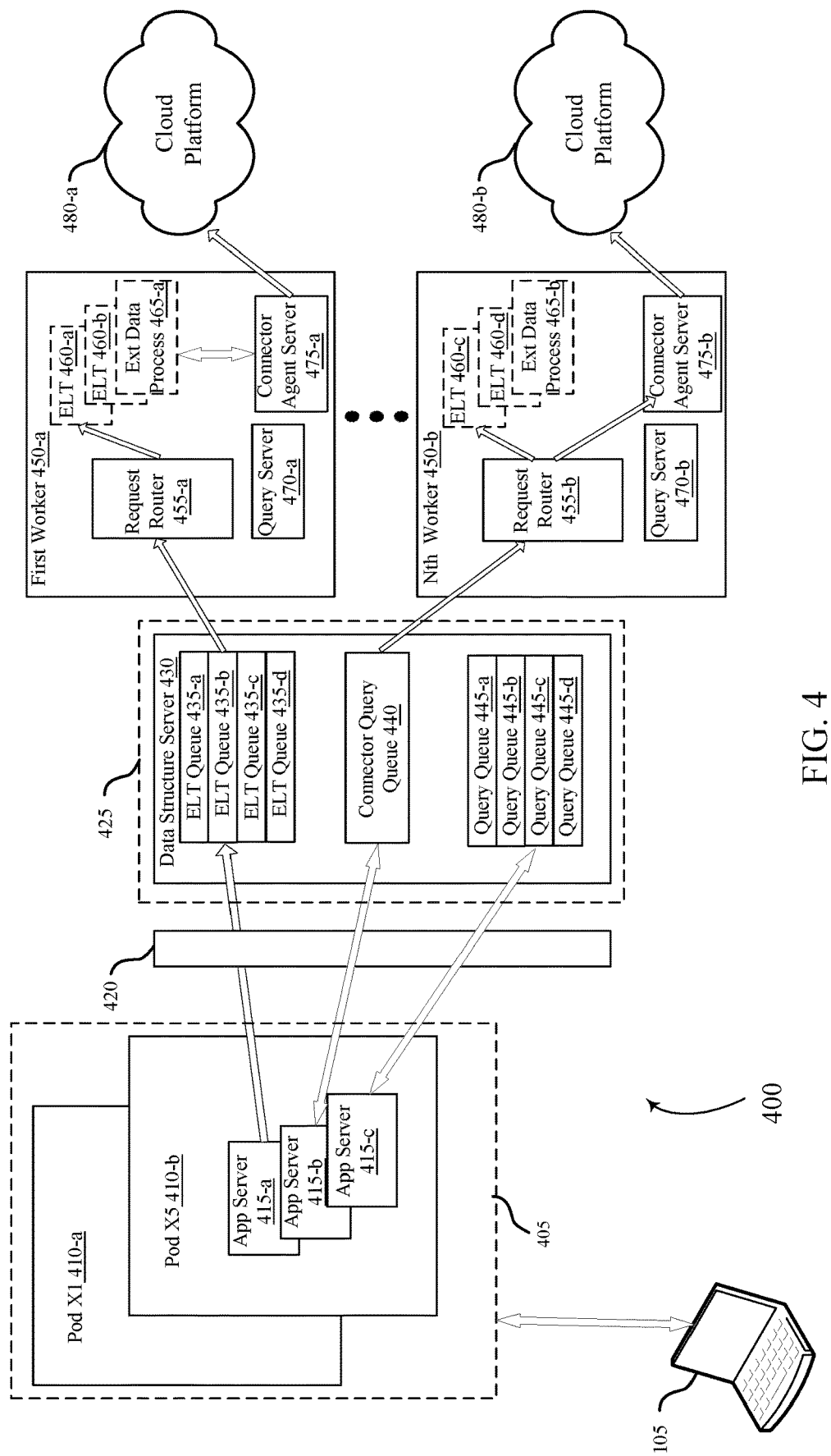
FIG. 4 illustrates an example of a database system that supports query conversion for querying disparate data sources in accordance with aspects of the present disclosure.

FIG. 4 illustrates an example of a database system 400 that supports query conversion for querying disparate data sources in accordance with aspects of the present disclosure. The system 400, which may be an example of a data analysis system, includes pods, or clusters, 405 including a plurality of pods 410 including a plurality of application servers 415, a validation and ID protection (VIP) service 420, a superpod 425 including a data structure server 430 including a plurality of extract, load, and transform (ELT) queues 435, a connector query 440, and a plurality of query queues 445, a plurality of workers 450, and a plurality of cloud platforms 480. In some examples, the plurality of workers 450 may include request router 455, a plurality of ELTs 460, an external data process 465, a query server 470, and a connector agent server 475. The connector agent may be an example of a connector server or a remote query execution server. The system 400 may implement aspects of the system 100 as described with reference to FIG. 1 and may implement aspects of the generic query 200 or the multiple source generic query 300 as described with reference to FIGS. 2 and 3, respectively. For example, a pod 405, a VIP 420, a superpod 425, and a data structure server 430, or a combination thereof may be examples or components of a data center 120. An application server 415, an ELT queue 435, a connector query queue 440, and a query queue 445, or a combination thereof may implement aspects of subsystem 125, generic query 200, or multiple source generic query 300 as described with references to FIGS. 1-3.

In some cases, a user device 105, such as the user devices associated with the cloud client 105 shown in FIG. 1, may generate a query for the data that is disparate to the database system 400 which may be received by one of the application servers 415. In this case, the application server 415-*b* may receive the query and determine that the data requested by the received query is disparate to the database system 400 and stored within the cloud platform 480-*b*. Based on this determination, the application server 415-*a* may select connector query queue 440 corresponding to interaction with the cloud platform 480-*b* by the database system 400.

In some cases, the database system 400 identifies a first query language corresponding to the determined disparate data source. For example, the database system 400 may determine the first query language corresponding to the cloud platform 480-*b*. In some examples, the data structure server 430 may determine the first query language based on the corresponding data source.

In some cases, based on the determined first query language, the database system 400 may generate a converted query from the query received from the user. The system 400 may implement aspects of the generic query 200 or the multiple source generic query 300 to generate the converted query as described herein with reference to FIGS. 2 and 3. In some examples, as illustrated in FIG. 4, the converted query is transmitted via the connector query 440 to a request router 455-*b* associated with an Nth worker 450-*b*. In some examples, the converted query is transmitted to both of an ELT 460 and a connector agent server 475-*b*.

In some cases, the converted query is transmitted from the connector agent server 475-*b* via the selected connector query 440 to the cloud platform 480-*b* that contains the queried data and the queried data is retrieved for visualization and analyzation by the user from the cloud platform 480-*b* based at least in part on the converted query.

Figure 5:
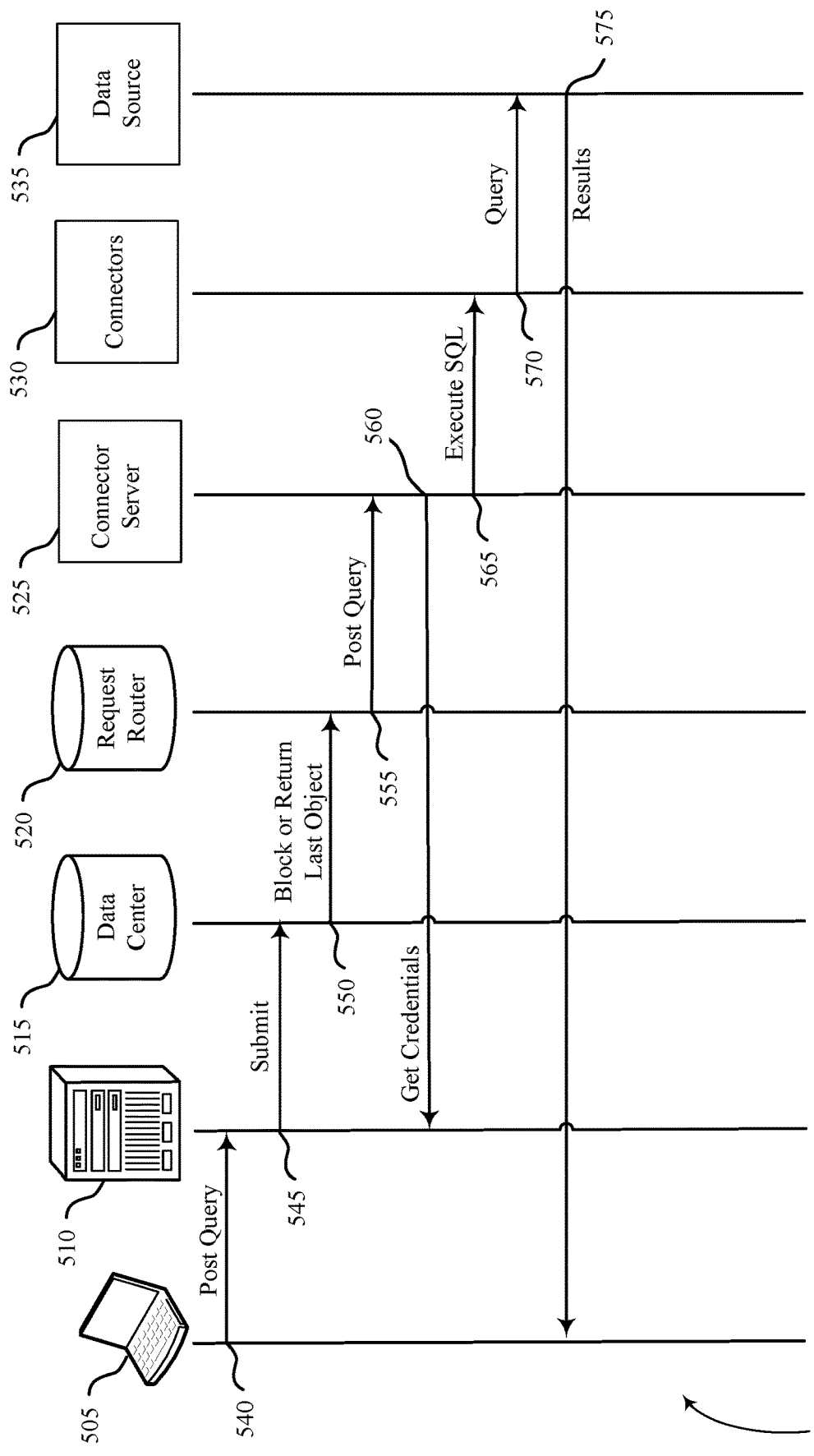
FIG. 5 illustrates an example of a process flow diagram that supports query conversion for querying disparate data sources in accordance with aspects of the present disclosure.

FIG. 5 illustrates an example of a process flow diagram 500 that supports query conversion for querying disparate data sources in accordance with aspects of the present disclosure. Specifically, the process flow diagram 500 illustrates a process that supports query conversion for querying disparate data sources using SQL queries. The process flow 500 may include a user device 505, a database server 510, a data center 515 associated with the database server 510, an request router 520, a connector server 525, one or more connectors 530, and one or more data source 535. These may be examples of the corresponding devices described with reference to FIGS. 1 through 4. The database server 510 may receive and update credentials in the data center 515.

In some cases, a user may query an internal database system (e.g., the database server 510, the data center 515, and the request router 520) or an external data storage system (e.g., the one or more data source 535) via a UI, such as a UI associated with the user device 505, for more information related to a set of data that is not stored by the database system. For example, user device 505 may be used to query the database system for data to display in the UI. In another example, where a user is querying the internal database system, the process flow 500 may not include the connectors 530 and the internal database may be queried directly without the use of the connectors 530 using an SOQL or an SAQL query. Alternative examples of the following may be implemented, where some steps are performed in a different order than described or are not performed at all. In some cases, steps may include additional features not mentioned below, or further steps may be added.

At first step 540, the database server 510 may receive a query. In some cases, the query may be based on a user selection at the user device 505 initiating the query. In some cases, the query may be initiated from a UI associated with the user device 505. In some cases, the query may be for data stored within an internal data server. For example, the data stored within the internal data server may include datasets stored by one or more the data center 515 or the request router 520. In some cases, the query may be for data stored or maintained externally to the internal database system. For example, the data stored or maintained externally to the internal database system may include data stored by a third party or data stored in a cloud based storage system, such as cloud data sources 480 as described with reference to FIG. 4.

At 545, the database server may submit the received query. In some cases, the query may be a compact form that includes a capture of all input from a user into a single compact form, such as the compact form 205 shown in FIG. 2 or the multiple source compact form 305 shown in FIG. 3. The compact form may include one of the converted language queries, such as the converted language queries 215-225 or 315-325 as shown in FIGS. 2 and 3, respectively.

At 550, the data center 515 blocks or returns the last object from the request router 520. In some examples, the request router 520 is utilized to determine positive metrics associated with a user and to generate recognition associated with that user in connection with the positive metrics.

At 555, after passing through the request router 520, the generated query is posted to the connector server 525. In the connector server 525, a java database connectivity (JDBC) wrapper may be implemented to accommodate executing passed in queries (e.g., SQL queries) against a specific data source. Additionally, at 560, when the process flow 500 includes querying an external data source 535, following posting of the generated query to the remote query execution server, a request for credentials associated with the query and/or a user is transmitted to the database server 510. In some cases, when the process flow 500 includes directly querying an internal data source 535 by the connector server 525, the request for credentials associated with the query and/or user may not be required.

At 565, upon receiving the credentials, the remote query execution server executes a structured query language (SQL) based on the received query and transmits the resulting query to the connectors 530. In some examples, as described above, the connectors 530 are specific to the corresponding data source 535.

At 570, the connectors 530 query the data source 535 using the programming language of the data source 535 to generate a result. In some cases, the connectors 530 are live connectors that facilitate generation of results that represent real-time data present at the data source 535. A live connection may be marked as a live connection in an API or UI.

At 575, results generated by the query, in the form of representations of the data present at the data source 535, are transmitted to the user device 505 to be displayed on the UI for the user to visualize and explore alongside and concurrently with data stored internally within the database server 510, the data center 515, and the request router 520, among other internal platforms. In some examples, the results of the query are transmitted to portions of the internal database system including at least the request router 520, the data center 515, the database server 510, and the user device 505.

Figure 6:
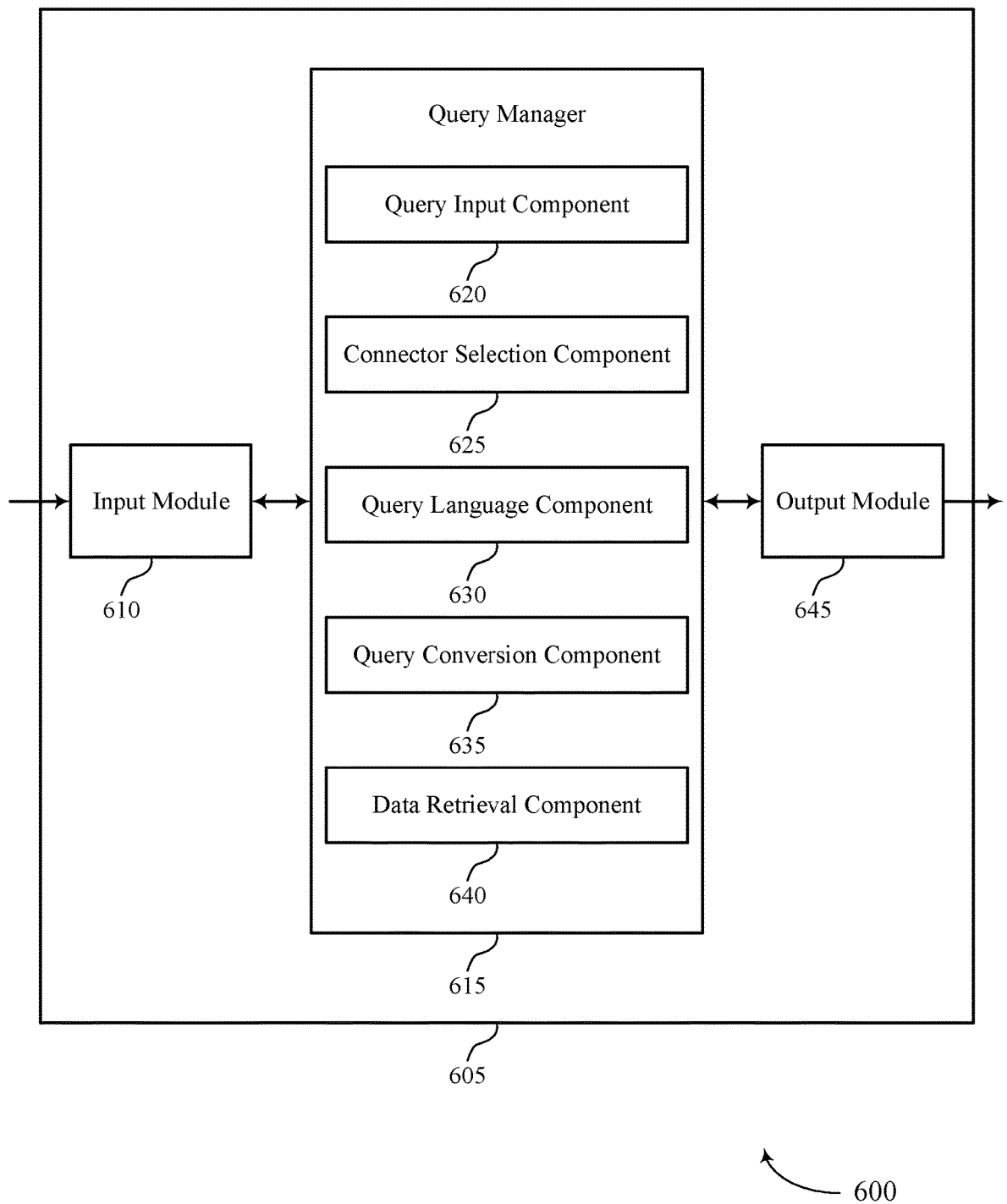
FIG. 6 shows a block diagram of an apparatus that supports query conversion for querying disparate data sources in accordance with aspects of the present disclosure.

FIG. 6 shows a block diagram 600 of an apparatus 605 that supports query conversion for querying disparate data sources in accordance with aspects of the present disclosure. The apparatus 605 may include an input module 610, a query manager 615, and an output module 645. The apparatus 605 may also include a processor. Each of these components may be in communication with one another (e.g., via one or more buses). In some cases, the apparatus 605 may be an example of a user terminal, a database server, or a system containing multiple computing devices.

The input module 610 may manage input signals for the apparatus 605. For example, the input module 610 may identify input signals based on an interaction with a modem, a keyboard, a mouse, a touchscreen, or a similar device. These input signals may be associated with user input or processing at other components or devices. In some cases, the input module 610 may utilize an operating system such as iOS®, ANDROID®, MS-DOS®, MS-WINDOWS®, OS/2®, UNIX®, LINUX®, or another known operating system to handle input signals. The input module 610 may send aspects of these input signals to other components of the apparatus 605 for processing. For example, the input module 610 may transmit input signals to the query manager 615 to support query conversion for querying disparate data sources. In some cases, the input module 610 may be a component of an input/output (I/O) controller 815 as described with reference to FIG. 8.

The query manager 615 may include a query input component 620, a connector selection component 625, a query language component 630, a query conversion component 635, and a data retrieval component 640. The query manager 615 may be an example of aspects of the query manager 705 or 810 described with reference to FIGS. 7 and 8.

The query manager 615 and/or at least some of its various sub-components may be implemented in hardware, software executed by a processor, firmware, or any combination thereof. If implemented in software executed by a processor, the functions of the query manager 615 and/or at least some of its various sub-components may be executed by a general-purpose processor, a digital signal processor (DSP), an application-specific integrated circuit (ASIC), a field-programmable gate array (FPGA) or other programmable logic device, discrete gate or transistor logic, discrete hardware components, or any combination thereof designed to perform the functions described in the present disclosure. The query manager 615 and/or at least some of its various sub-components may be physically located at various positions, including being distributed such that portions of functions are implemented at different physical locations by one or more physical devices. In some examples, the query manager 615 and/or at least some of its various sub-components may be a separate and distinct component in accordance with various aspects of the present disclosure. In other examples, the query manager 615 and/or at least some of its various sub-components may be combined with one or more other hardware components, including but not limited to an I/O component, a transceiver, a network server, another computing device, one or more other components described in the present disclosure, or a combination thereof in accordance with various aspects of the present disclosure.

The query input component 620 may receive an input for data stored at a first data source from a set of data sources.

The connector selection component 625 may select a first data connector from a set of data connectors, where the first data connector corresponds to the first data source.

The query language component 630 may identify a first query language corresponding to the first data source from a set of query languages.

The query conversion component 635 may generate a converted query based on the first query language.

The data retrieval component 640 may retrieve the data from the first data source using the first data connector based on the converted query.

The output module 645 may manage output signals for the apparatus 605. For example, the output module 645 may receive signals from other components of the apparatus 605, such as the query manager 615, and may transmit these signals to other components or devices. In some specific examples, the output module 645 may transmit output signals for display in a user interface, for storage in a database or data store, for further processing at a server or server cluster, or for any other processes at any number of devices or systems. In some cases, the output module 645 may be a component of an I/O controller 815 as described with reference to FIG. 8.

Figure 7:
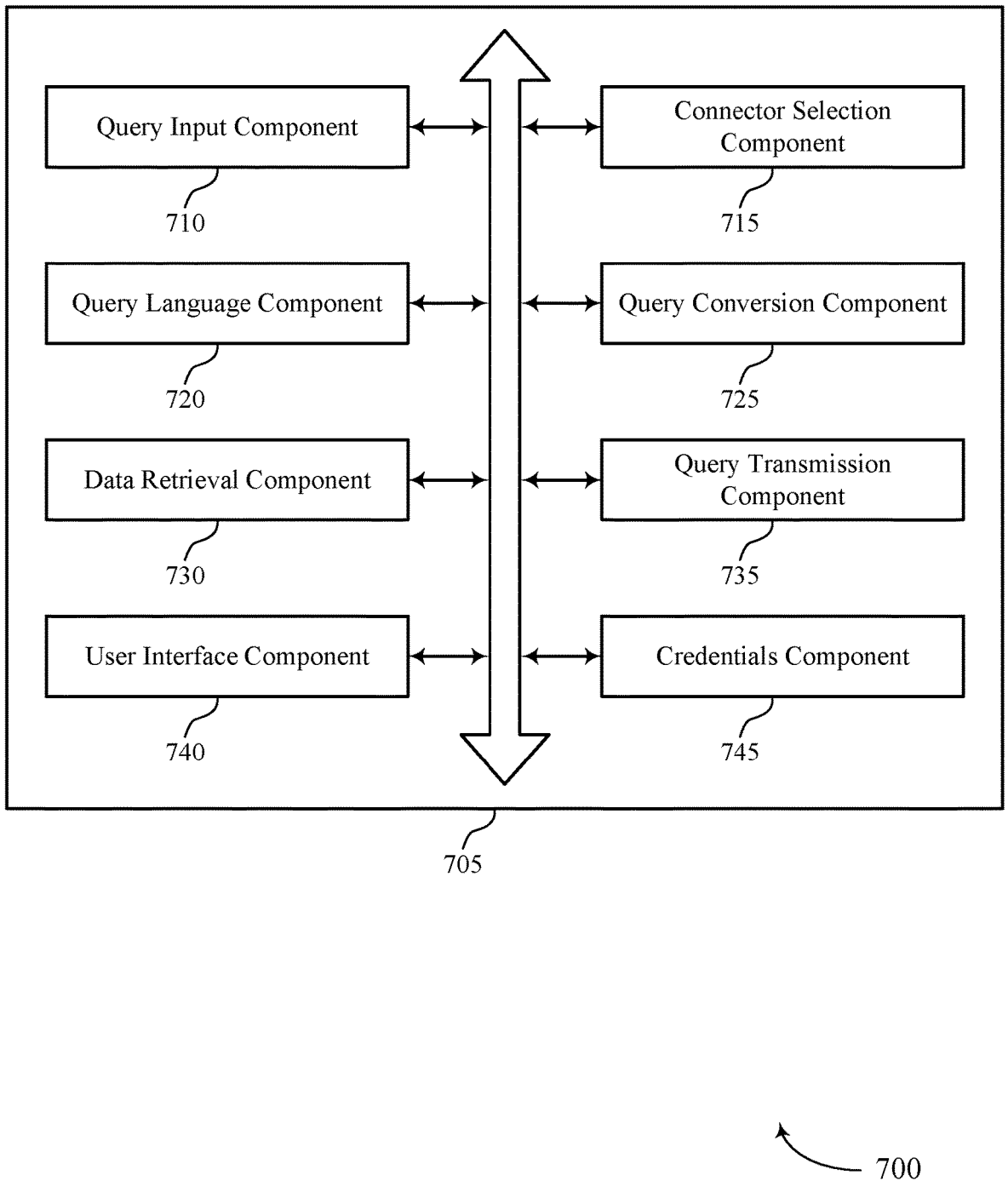
FIG. 7 shows a block diagram of a query manager that supports query conversion for querying disparate data sources in accordance with aspects of the present disclosure.

FIG. 7 shows a block diagram 700 of a query manager 705 that supports query conversion for querying disparate data sources in accordance with aspects of the present disclosure. The query manager 705 may be an example of aspects of a query manager 615 or a query manager 810 described herein. The query manager 705 may include a query input component 710, a connector selection component 715, a query language component 720, a query conversion component 725, a data retrieval component 730, a query transmission component 735, an user interface component 740, and a credentials component 745. Each of these modules may communicate, directly or indirectly, with one another (e.g., via one or more buses).

The query input component 710 may receive an input for data stored at a first data source from a set of data sources.

In some cases, the first data source includes a cloud data source.

The connector selection component 715 may select a first data connector from a set of data connectors, where the first data connector corresponds to the first data source.

The query language component 720 may identify a first query language corresponding to the first data source from a set of query languages.

The query conversion component 725 may generate a converted query based on the first query language.

In some examples, the query conversion component 725 may map features of a set of different query languages into a set of groupings, where generating the converted query is based on the mapping.

In some cases, the set of groupings includes columns, groups, name, orders, source filters, aggregate filters, limit, data sources, or a combination thereof.

In some cases, the converted query is generated at a web browser at the client device.

The data retrieval component 730 may retrieve the data from the first data source using the first data connector based on the converted query.

The query transmission component 735 may transmit, from an application server, the converted query directly to the internal data source.

In some examples, the query transmission component 735 may transmit, from an application server, the converted query directly to the external data source.

In some examples, the query transmission component 735 may transmit, from an application server, the converted query to a connector for relaying the converted query to the external data source.

The user interface component 740 may display, at a user interface of the client device, a compact form or generic query form that is common to a set of query languages corresponding to the set of data sources.

The credentials component 745 may receive, at an application server, a request for credentials associated with accessing the first data source.

Figure 8:
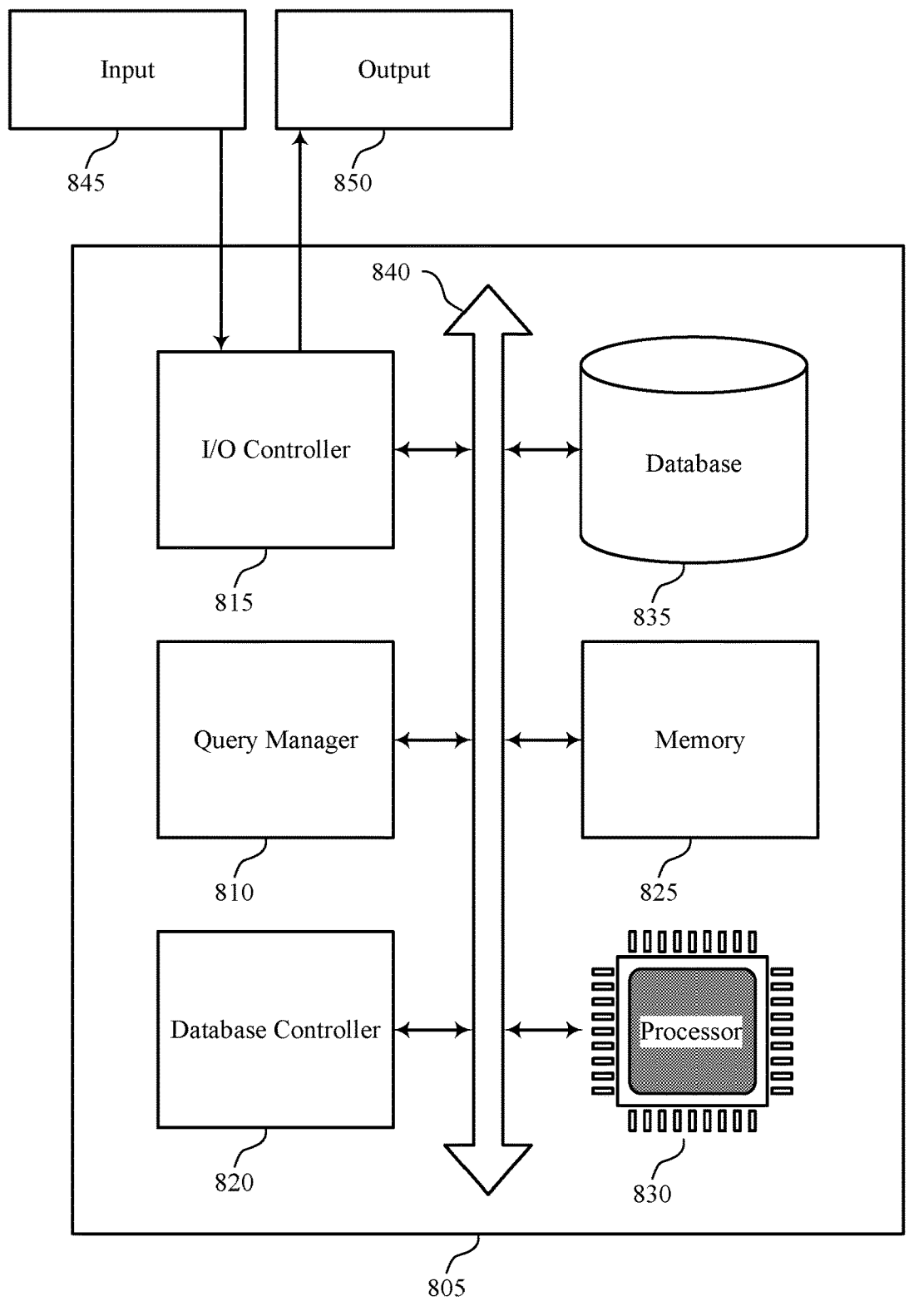
FIG. 8 shows a diagram of a system including a device that supports query conversion for querying disparate data sources in accordance with aspects of the present disclosure.

FIG. 8 shows a diagram of a system 800 including a device 805 that supports query conversion for querying disparate data sources in accordance with aspects of the present disclosure. The device 805 may be an example of or include the components of a user device or an apparatus 605 as described herein. The device 805 may include components for bi-directional data communications including components for transmitting and receiving communications, including a query manager 810, an I/O controller 815, a database controller 820, memory 825, a processor 830, and a database 835. These components may be in electronic communication via one or more buses (e.g., bus 840).

The query manager 810 may be an example of a query manager 615 or 705 as described herein. For example, the query manager 810 may perform any of the methods or processes described above with reference to FIGS. 6 and 7. In some cases, the query manager 810 may be implemented in hardware, software executed by a processor, firmware, or any combination thereof.

The I/O controller 815 may manage input signals 845 and output signals 850 for the device 805. The I/O controller 815 may also manage peripherals not integrated into the device 805. In some cases, the I/O controller 815 may represent a physical connection or port to an external peripheral. In some cases, the I/O controller 815 may utilize an operating system such as iOS®, ANDROID®, MS-DOS®, MS-WINDOWS®, OS/2®, UNIX®, LINUX®, or another known operating system. In other cases, the I/O controller 815 may represent or interact with a modem, a keyboard, a mouse, a touchscreen, or a similar device. In some cases, the I/O controller 815 may be implemented as part of a processor. In some cases, a user may interact with the device 805 via the I/O controller 815 or via hardware components controlled by the I/O controller 815.

The database controller 820 may manage data storage and processing in a database 835. In some cases, a user may interact with the database controller 820. In other cases, the database controller 820 may operate automatically without user interaction. The database 835 may be an example of a single database, a distributed database, multiple distributed databases, a data store, a data lake, or an emergency backup database.

Memory 825 may include random-access memory (RAM) and read-only memory (ROM). The memory 825 may store computer-readable, computer-executable software including instructions that, when executed, cause the processor to perform various functions described herein. In some cases, the memory 825 may contain, among other things, a basic input/output system (BIOS) which may control basic hardware or software operation such as the interaction with peripheral components or devices.

The processor 830 may include an intelligent hardware device, (e.g., a general-purpose processor, a DSP, a central processing unit (CPU), a microcontroller, an ASIC, an FPGA, a programmable logic device, a discrete gate or transistor logic component, a discrete hardware component, or any combination thereof). In some cases, the processor 830 may be configured to operate a memory array using a memory controller. In other cases, a memory controller may be integrated into the processor 830. The processor 830 may be configured to execute computer-readable instructions stored in a memory 825 to perform various functions (e.g., functions or tasks supporting query conversion for querying disparate data sources).

Figure 9:
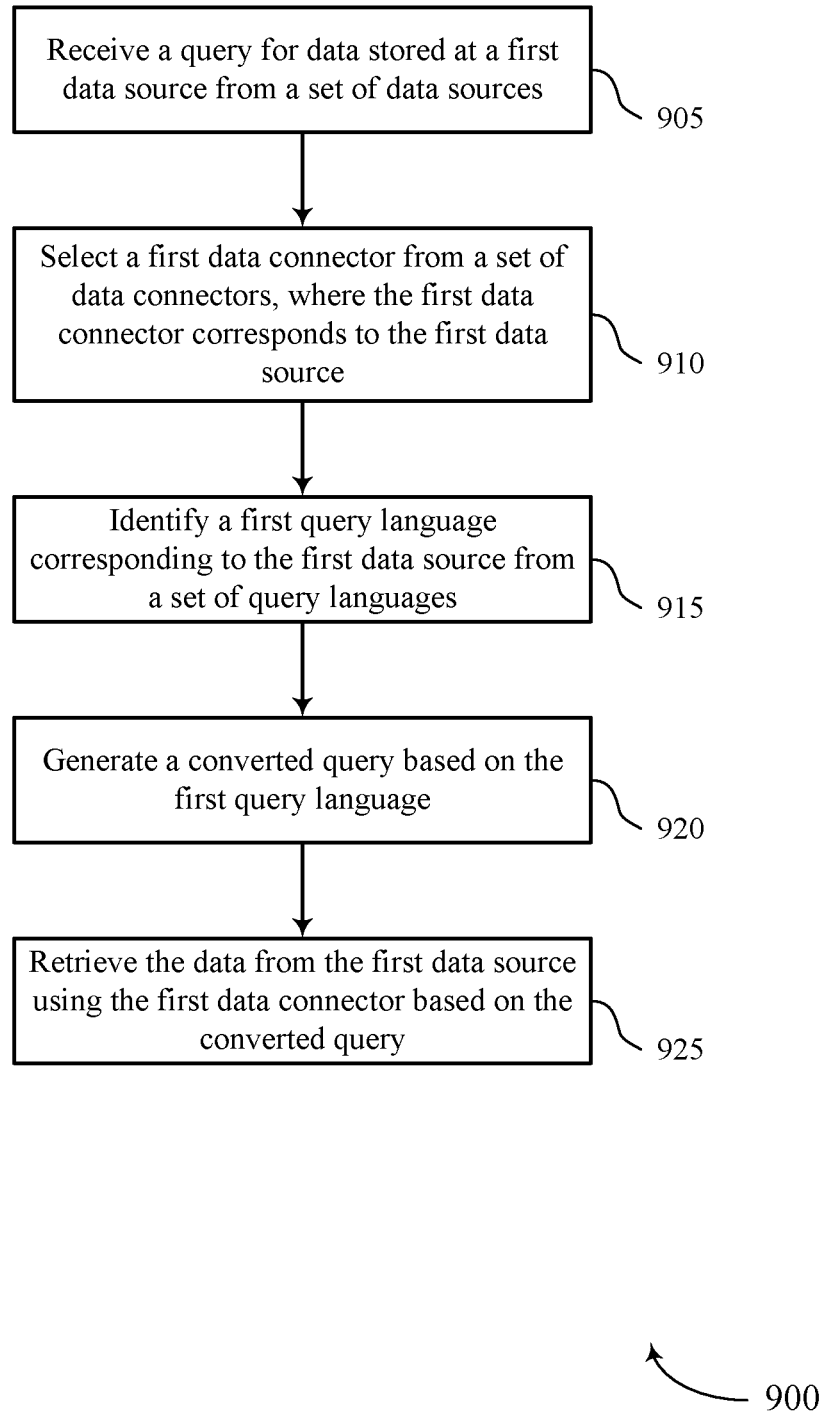
FIGS. 9 through 14 show flowcharts illustrating methods that support query conversion for querying disparate data sources in accordance with aspects of the present disclosure.

FIG. 9 shows a flowchart illustrating a method 900 that supports query conversion for querying disparate data sources in accordance with aspects of the present disclosure. The operations of method 900 may be implemented by a user device or its components as described herein. For example, the operations of method 900 may be performed by a query manager as described with reference to FIGS. 6 through 8. In some examples, a user device may execute a set of instructions to control the functional elements of the user device to perform the functions described below. Additionally or alternatively, a user device may perform aspects of the functions described below using special-purpose hardware.

At 905, the user device may receive an input for data stored at a first data source from a set of data sources. The operations of 905 may be performed according to the methods described herein. In some examples, aspects of the operations of 905 may be performed by a query input component as described with reference to FIGS. 6 through 8.

At 910, the user device may select a first data connector from a set of data connectors, where the first data connector corresponds to the first data source. The operations of 910 may be performed according to the methods described herein. In some examples, aspects of the operations of 910 may be performed by a connector selection component as described with reference to FIGS. 6 through 8.

At 915, the user device may identify a first query language corresponding to the first data source from a set of query languages. The operations of 915 may be performed according to the methods described herein. In some examples, aspects of the operations of 915 may be performed by a query language component as described with reference to FIGS. 6 through 8.

At 920, the user device may generate a converted query based on the first query language. The operations of 920 may be performed according to the methods described herein. In some examples, aspects of the operations of 920 may be performed by a query conversion component as described with reference to FIGS. 6 through 8.

At 925, the user device may retrieve the data from the first data source using the first data connector based on the converted query. The operations of 925 may be performed according to the methods described herein. In some examples, aspects of the operations of 925 may be performed by a data retrieval component as described with reference to FIGS. 6 through 8.

Figure 10:
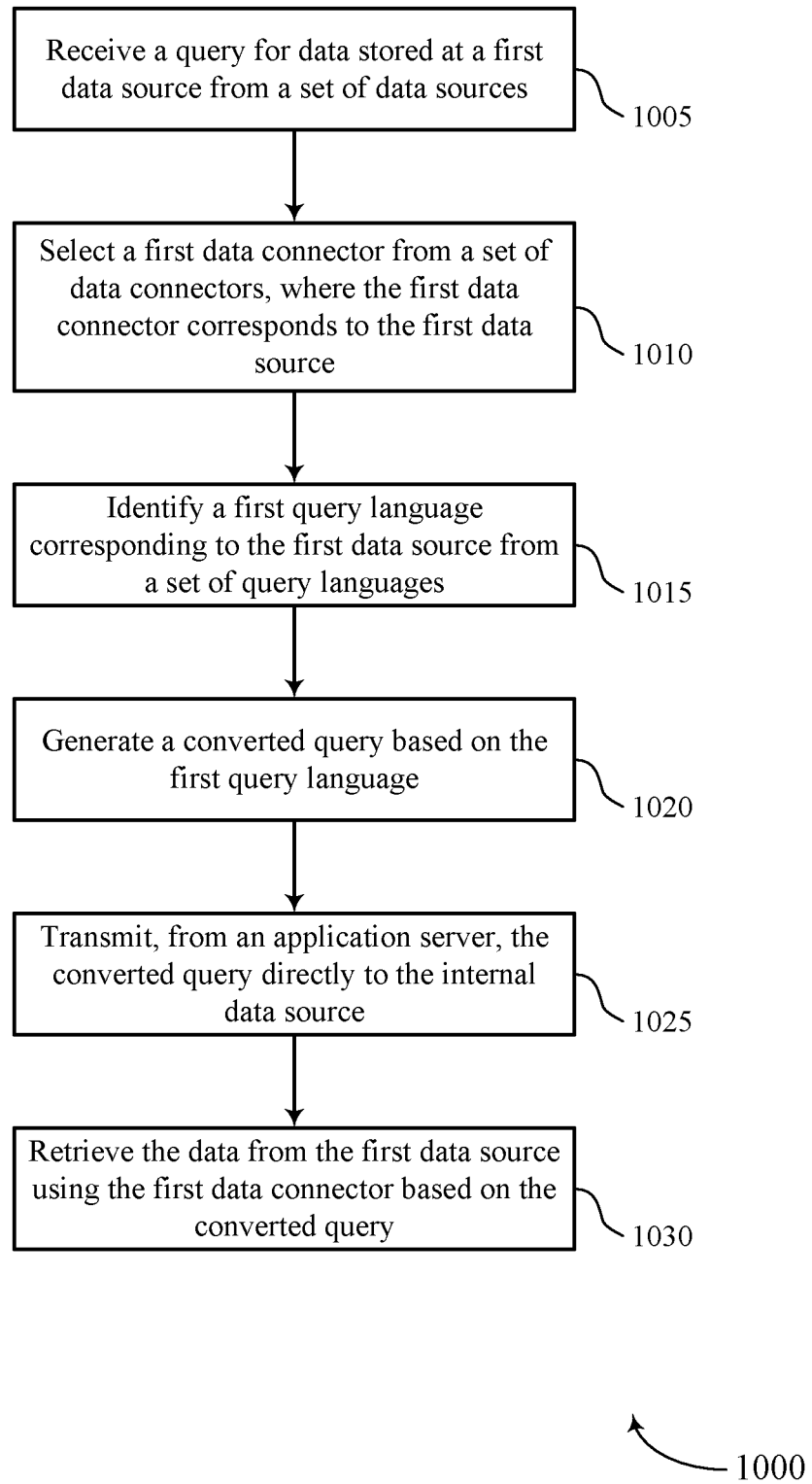

FIG. 10 shows a flowchart illustrating a method 1000 that supports query conversion for querying disparate data sources in accordance with aspects of the present disclosure. The operations of method 1000 may be implemented by a user device or its components as described herein. For example, the operations of method 1000 may be performed by a query manager as described with reference to FIGS. 6 through 8. In some examples, a user device may execute a set of instructions to control the functional elements of the user device to perform the functions described below. Additionally or alternatively, a user device may perform aspects of the functions described below using special-purpose hardware.

At 1005, the user device may receive an input for data stored at a first data source from a set of data sources. The operations of 1005 may be performed according to the methods described herein. In some examples, aspects of the operations of 1005 may be performed by a query input component as described with reference to FIGS. 6 through 8.

At 1010, the user device may select a first data connector from a set of data connectors, where the first data connector corresponds to the first data source. The operations of 1010 may be performed according to the methods described herein. In some examples, aspects of the operations of 1010 may be performed by a connector selection component as described with reference to FIGS. 6 through 8.

At 1015, the user device may identify a first query language corresponding to the first data source from a set of query languages. The operations of 1015 may be performed according to the methods described herein. In some examples, aspects of the operations of 1015 may be performed by a query language component as described with reference to FIGS. 6 through 8.

At 1020, the user device may generate a converted query based on the first query language. The operations of 1020 may be performed according to the methods described herein. In some examples, aspects of the operations of 1020 may be performed by a query conversion component as described with reference to FIGS. 6 through 8.

At 1025, the user device may transmit, from an application server, the converted query directly to the internal data source. The operations of 1025 may be performed according to the methods described herein. In some examples, aspects of the operations of 1025 may be performed by a query transmission component as described with reference to FIGS. 6 through 8.

At 1030, the user device may retrieve the data from the first data source using the first data connector based on the converted query. The operations of 1030 may be performed according to the methods described herein. In some examples, aspects of the operations of 1030 may be performed by a data retrieval component as described with reference to FIGS. 6 through 8.

Figure 11:
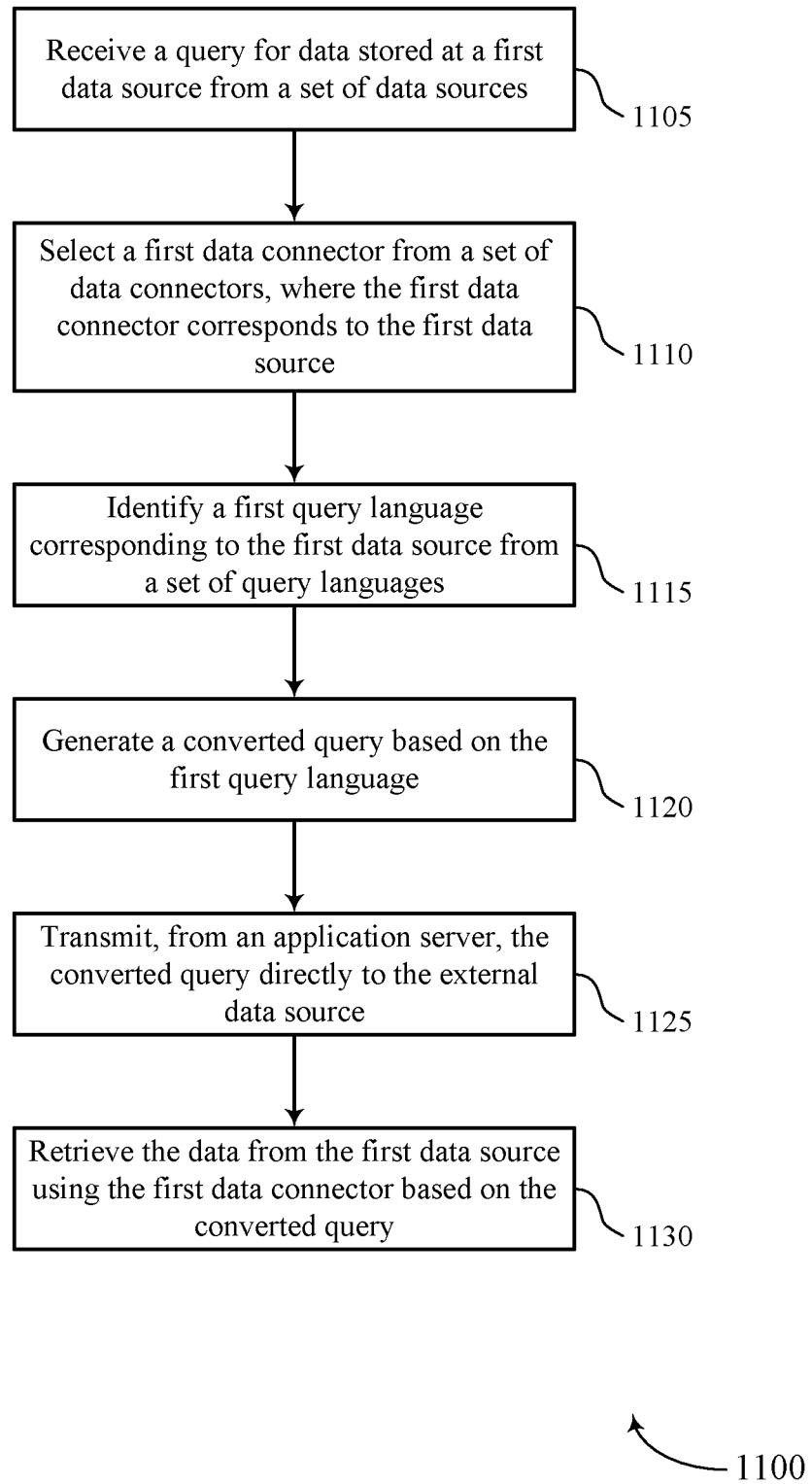

FIG. 11 shows a flowchart illustrating a method 1100 that supports query conversion for querying disparate data sources in accordance with aspects of the present disclosure. The operations of method 1100 may be implemented by a user device or its components as described herein. For example, the operations of method 1100 may be performed by a query manager as described with reference to FIGS. 6 through 8. In some examples, a user device may execute a set of instructions to control the functional elements of the user device to perform the functions described below. Additionally or alternatively, a user device may perform aspects of the functions described below using special-purpose hardware.

At 1105, the user device may receive an input for data stored at a first data source from a set of data sources. The operations of 1105 may be performed according to the methods described herein. In some examples, aspects of the operations of 1105 may be performed by a query input component as described with reference to FIGS. 6 through 8.

At 1110, the user device may select a first data connector from a set of data connectors, where the first data connector corresponds to the first data source. The operations of 1110 may be performed according to the methods described herein. In some examples, aspects of the operations of 1110 may be performed by a connector selection component as described with reference to FIGS. 6 through 8.

At 1115, the user device may identify a first query language corresponding to the first data source from a set of query languages. The operations of 1115 may be performed according to the methods described herein. In some examples, aspects of the operations of 1115 may be performed by a query language component as described with reference to FIGS. 6 through 8.

At 1120, the user device may generate a converted query based on the first query language. The operations of 1120 may be performed according to the methods described herein. In some examples, aspects of the operations of 1120 may be performed by a query conversion component as described with reference to FIGS. 6 through 8.

At 1125, the user device may transmit, from an application server, the converted query directly to the external data source. The operations of 1125 may be performed according to the methods described herein. In some examples, aspects of the operations of 1125 may be performed by a query transmission component as described with reference to FIGS. 6 through 8.

At 1130, the user device may retrieve the data from the first data source using the first data connector based on the converted query. The operations of 1130 may be performed according to the methods described herein. In some examples, aspects of the operations of 1130 may be performed by a data retrieval component as described with reference to FIGS. 6 through 8.

Figure 12:
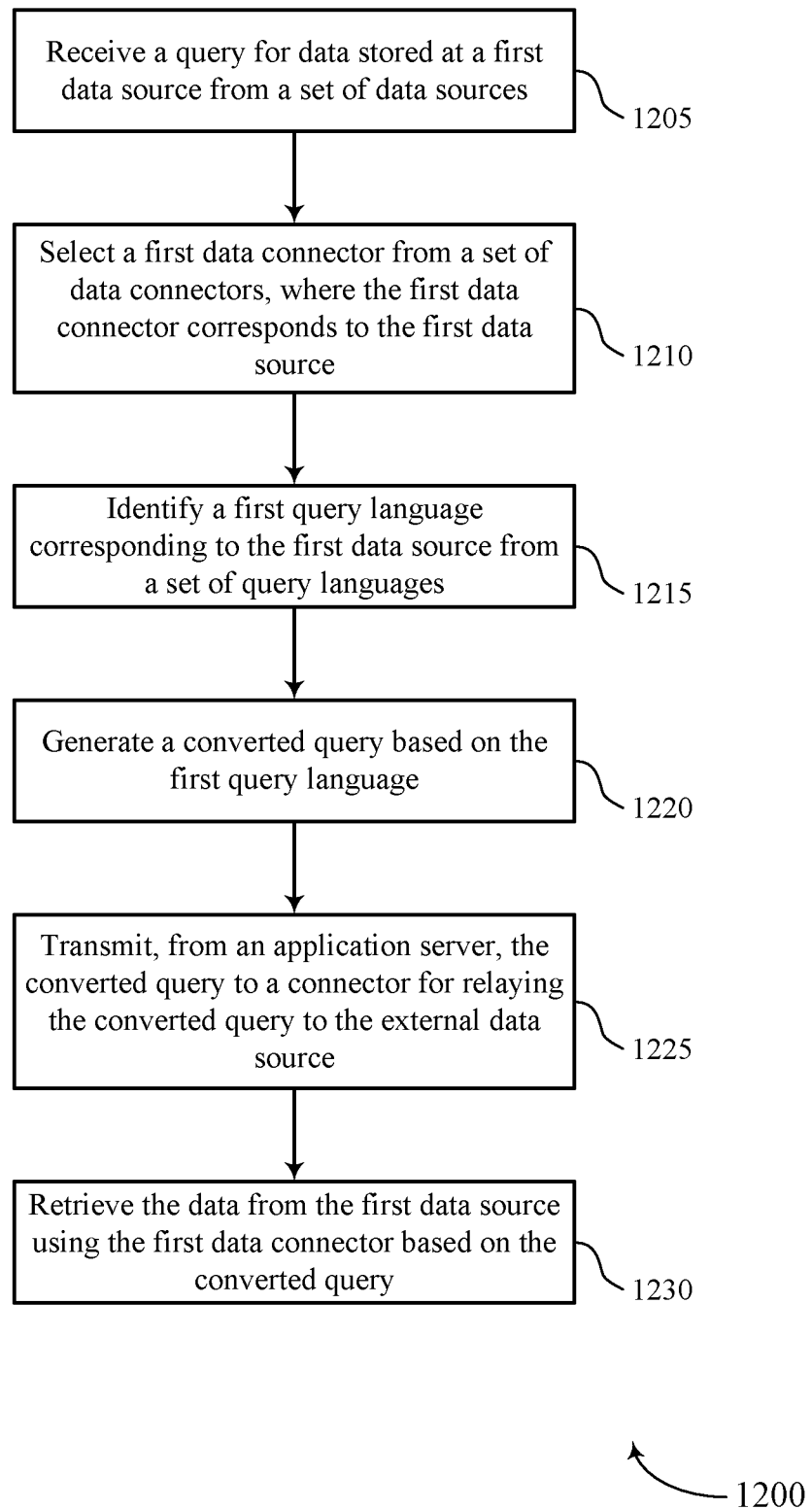

FIG. 12 shows a flowchart illustrating a method 1200 that supports query conversion for querying disparate data sources in accordance with aspects of the present disclosure. The operations of method 1200 may be implemented by a user device or its components as described herein. For example, the operations of method 1200 may be performed by a query manager as described with reference to FIGS. 6 through 8. In some examples, a user device may execute a set of instructions to control the functional elements of the user device to perform the functions described below. Additionally or alternatively, a user device may perform aspects of the functions described below using special-purpose hardware.

At 1205, the user device may receive an input for data stored at a first data source from a set of data sources. The operations of 1205 may be performed according to the methods described herein. In some examples, aspects of the operations of 1205 may be performed by a query input component as described with reference to FIGS. 6 through 8.

At 1210, the user device may select a first data connector from a set of data connectors, where the first data connector corresponds to the first data source. The operations of 1210 may be performed according to the methods described herein. In some examples, aspects of the operations of 1210 may be performed by a connector selection component as described with reference to FIGS. 6 through 8.

At 1215, the user device may identify a first query language corresponding to the first data source from a set of query languages. The operations of 1215 may be performed according to the methods described herein. In some examples, aspects of the operations of 1215 may be performed by a query language component as described with reference to FIGS. 6 through 8.

At 1220, the user device may generate a converted query based on the first query language. The operations of 1220 may be performed according to the methods described herein. In some examples, aspects of the operations of 1220 may be performed by a query conversion component as described with reference to FIGS. 6 through 8.

At 1225, the user device may transmit, from an application server, the converted query to a connector for relaying the converted query to the external data source. The operations of 1225 may be performed according to the methods described herein. In some examples, aspects of the operations of 1225 may be performed by a query transmission component as described with reference to FIGS. 6 through 8.

At 1230, the user device may retrieve the data from the first data source using the first data connector based on the converted query. The operations of 1230 may be performed according to the methods described herein. In some examples, aspects of the operations of 1230 may be performed by a data retrieval component as described with reference to FIGS. 6 through 8.

Figure 13:
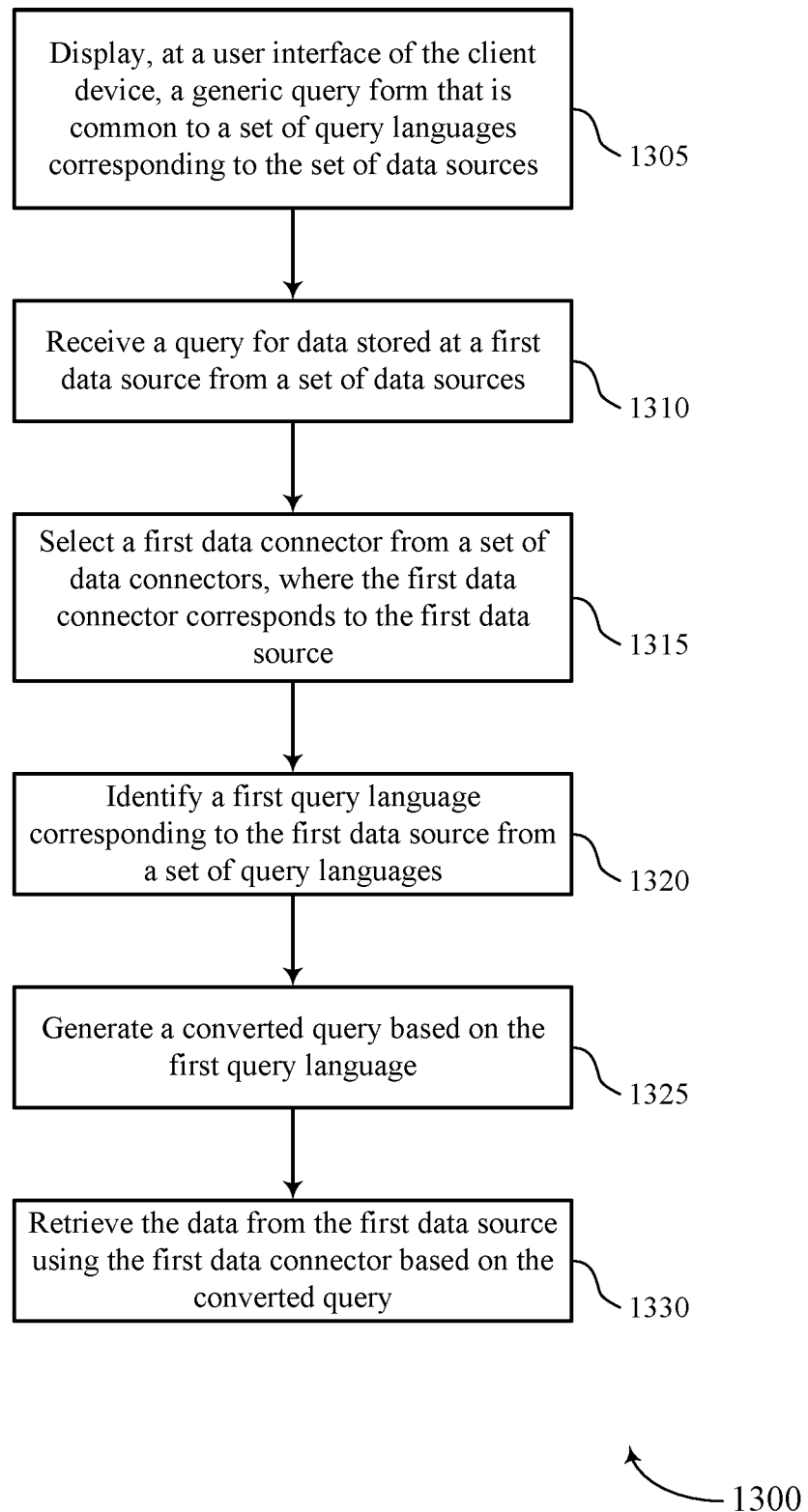

FIG. 13 shows a flowchart illustrating a method 1300 that supports query conversion for querying disparate data sources in accordance with aspects of the present disclosure. The operations of method 1300 may be implemented by a user device or its components as described herein. For example, the operations of method 1300 may be performed by a query manager as described with reference to FIGS. 6 through 8. In some examples, a user device may execute a set of instructions to control the functional elements of the user device to perform the functions described below. Additionally or alternatively, a user device may perform aspects of the functions described below using special-purpose hardware.

At 1305, the user device may display, at a user interface of the client device, a compact form or generic query form that is common to a set of query languages corresponding to the set of data sources. The operations of 1305 may be performed according to the methods described herein. In some examples, aspects of the operations of 1305 may be performed by an user interface component as described with reference to FIGS. 6 through 8.

At 1310, the user device may receive an input for data stored at a first data source from a set of data sources. The operations of 1310 may be performed according to the methods described herein. In some examples, aspects of the operations of 1310 may be performed by a query input component as described with reference to FIGS. 6 through 8.

At 1315, the user device may select a first data connector from a set of data connectors, where the first data connector corresponds to the first data source. The operations of 1315 may be performed according to the methods described herein. In some examples, aspects of the operations of 1315 may be performed by a connector selection component as described with reference to FIGS. 6 through 8.

At 1320, the user device may identify a first query language corresponding to the first data source from a set of query languages. The operations of 1320 may be performed according to the methods described herein. In some examples, aspects of the operations of 1320 may be performed by a query language component as described with reference to FIGS. 6 through 8.

At 1325, the user device may generate a converted query based on the first query language. The operations of 1325 may be performed according to the methods described herein. In some examples, aspects of the operations of 1325 may be performed by a query conversion component as described with reference to FIGS. 6 through 8.

At 1330, the user device may retrieve the data from the first data source using the first data connector based on the converted query. The operations of 1330 may be performed according to the methods described herein. In some examples, aspects of the operations of 1330 may be performed by a data retrieval component as described with reference to FIGS. 6 through 8.

Figure 14:
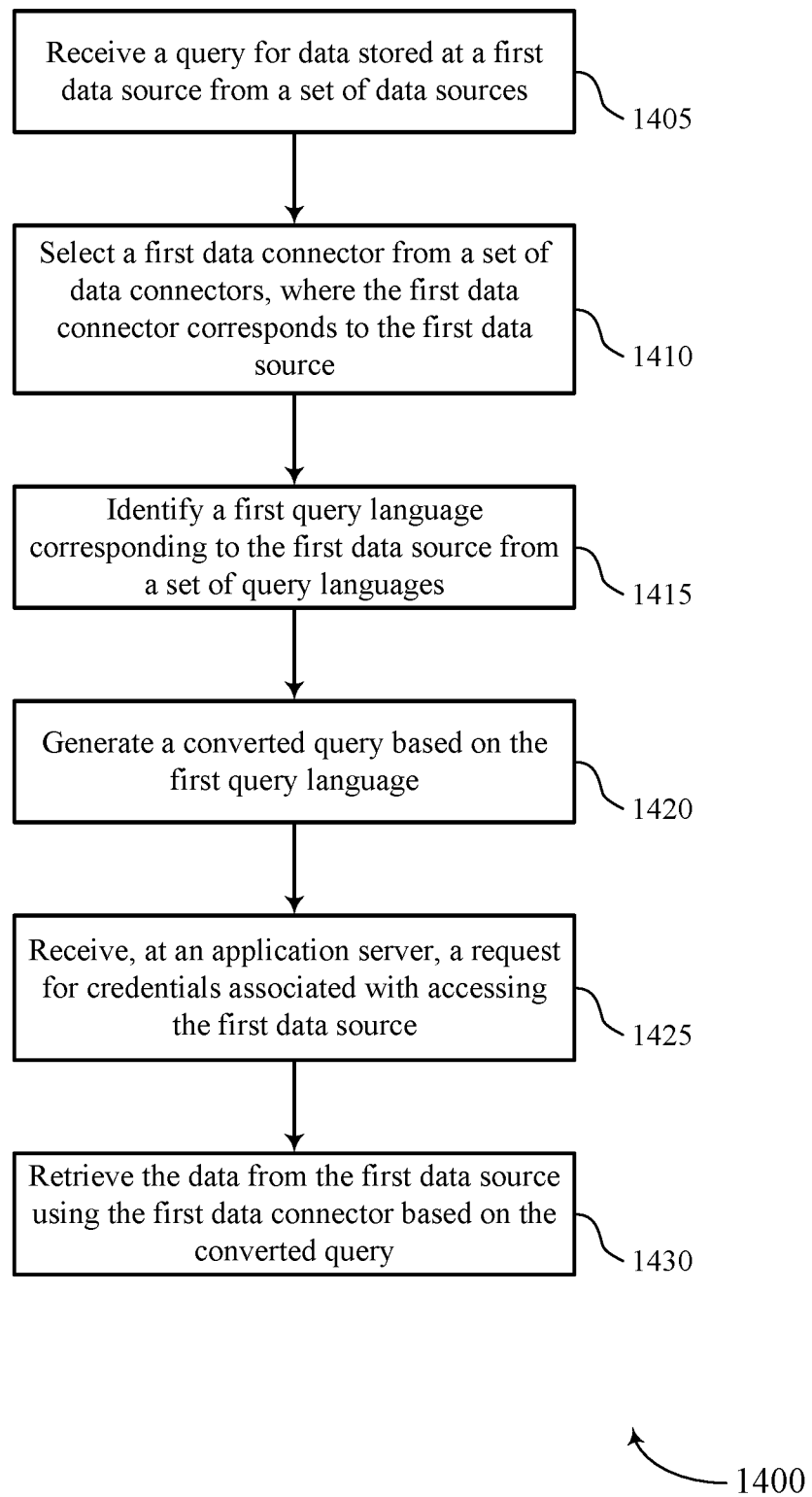

FIG. 14 shows a flowchart illustrating a method 1400 that supports query conversion for querying disparate data sources in accordance with aspects of the present disclosure. The operations of method 1400 may be implemented by a user device or its components as described herein. For example, the operations of method 1400 may be performed by a query manager as described with reference to FIGS. 6 through 8. In some examples, a user device may execute a set of instructions to control the functional elements of the user device to perform the functions described below. Additionally or alternatively, a user device may perform aspects of the functions described below using special-purpose hardware.

At 1405, the user device may receive an input for data stored at a first data source from a set of data sources. The operations of 1405 may be performed according to the methods described herein. In some examples, aspects of the operations of 1405 may be performed by a query input component as described with reference to FIGS. 6 through 8.

At 1410, the user device may select a first data connector from a set of data connectors, where the first data connector corresponds to the first data source. The operations of 1410 may be performed according to the methods described herein. In some examples, aspects of the operations of 1410 may be performed by a connector selection component as described with reference to FIGS. 6 through 8.

At 1415, the user device may identify a first query language corresponding to the first data source from a set of query languages. The operations of 1415 may be performed according to the methods described herein. In some examples, aspects of the operations of 1415 may be performed by a query language component as described with reference to FIGS. 6 through 8.

At 1420, the user device may generate a converted query based on the first query language. The operations of 1420 may be performed according to the methods described herein. In some examples, aspects of the operations of 1420 may be performed by a query conversion component as described with reference to FIGS. 6 through 8.

At 1425, the user device may receive, at an application server, a request for credentials associated with accessing the first data source. The operations of 1425 may be performed according to the methods described herein. In some examples, aspects of the operations of 1425 may be performed by a credentials component as described with reference to FIGS. 6 through 8.

At 1430, the user device may retrieve the data from the first data source using the first data connector based on the converted query. The operations of 1430 may be performed according to the methods described herein. In some examples, aspects of the operations of 1430 may be performed by a data retrieval component as described with reference to FIGS. 6 through 8.

A method of querying disparate data sources at a user device is described. The method may include receiving an input for data stored at a first data source from a set of data sources, selecting a first data connector from a set of data connectors, where the first data connector corresponds to the first data source, identifying a first query language corresponding to the first data source from a set of query languages, generating a converted query based on the first query language, and retrieving the data from the first data source using the first data connector based on the converted query.

An apparatus for querying disparate data sources at a user device is described. The apparatus may include a processor, memory coupled with the processor, and instructions stored in the memory. The instructions may be executable by the processor to cause the apparatus to receive an input for data stored at a first data source from a set of data sources, select a first data connector from a set of data connectors, where the first data connector corresponds to the first data source, identify a first query language corresponding to the first data source from a set of query languages, generate a converted query based on the first query language, and retrieve the data from the first data source using the first data connector based on the converted query.

Another apparatus for querying disparate data sources at a user device is described. The apparatus may include means for receiving an input for data stored at a first data source from a set of data sources, selecting a first data connector from a set of data connectors, where the first data connector corresponds to the first data source, identifying a first query language corresponding to the first data source from a set of query languages, generating a converted query based on the first query language, and retrieving the data from the first data source using the first data connector based on the converted query.

A non-transitory computer-readable medium storing code for querying disparate data sources at a user device is described. The code may include instructions executable by a processor to receive an input for data stored at a first data source from a set of data sources, select a first data connector from a set of data connectors, where the first data connector corresponds to the first data source, identify a first query language corresponding to the first data source from a set of query languages, generate a converted query based on the first query language, and retrieve the data from the first data source using the first data connector based on the converted query.

In some examples of the method, apparatuses, and non-transitory computer-readable medium described herein, the first data source may include operations, features, means, or instructions for transmitting, from an application server, the converted query directly to the internal data source.

In some examples of the method, apparatuses, and non-transitory computer-readable medium described herein, the first data source may include operations, features, means, or instructions for transmitting, from an application server, the converted query directly to the external data source.

In some examples of the method, apparatuses, and non-transitory computer-readable medium described herein, the first data source may include operations, features, means, or instructions for transmitting, from an application server, the converted query to a connector for relaying the converted query to the external data source.

Some examples of the method, apparatuses, and non-transitory computer-readable medium described herein may further include operations, features, means, or instructions for displaying, at a user interface of the client device, a compact form or generic query form that may be common to a set of query languages corresponding to the set of data sources.

Some examples of the method, apparatuses, and non-transitory computer-readable medium described herein may further include operations, features, means, or instructions for receiving, at an application server, a request for credentials associated with accessing the first data source.

Some examples of the method, apparatuses, and non-transitory computer-readable medium described herein may further include operations, features, means, or instructions for mapping features of a set of different query languages into a set of groupings, where generating the converted query may be based on the mapping.

In some examples of the method, apparatuses, and non-transitory computer-readable medium described herein, the set of groupings includes columns, groups, name, orders, source filters, aggregate filters, limit, data sources, or a combination thereof.

In some examples of the method, apparatuses, and non-transitory computer-readable medium described herein, the converted query may be generated at a web browser at the client device.

In some examples of the method, apparatuses, and non-transitory computer-readable medium described herein, the first data source includes a cloud data source.

It should be noted that the methods described above describe possible implementations, and that the operations and the steps may be rearranged or otherwise modified and that other implementations are possible. Furthermore, aspects from two or more of the methods may be combined.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for querying disparate data sources at a user device, comprising:
    receiving an input request for data from a first data source;
    displaying, at a user interface of a client device, a compact form to generate queries in a common query language for a plurality of query languages corresponding to a plurality of data sources, the compact form comprising a plurality of query building options available to interact with the first data source associated with the input request;
    receiving, via an input to the compact form, a query for data stored at the first data source from the plurality of data sources;
    selecting a first data connector from a plurality of data connectors, wherein the first data connector corresponds to the first data source;
    identifying a first query language corresponding to the first data source from the plurality of query languages;
    converting the query received in the common query language to a first query in the first query language; and
    retrieving the data from the first data source using the first data connector based at least in part on the first query.

2. The method of claim 1, wherein the first data source comprises an internal data source, the method further comprising:
    transmitting, from an application server, the first query directly to the internal data source.

3. The method of claim 1, wherein the first data source comprises an external data source, the method further comprising:
    transmitting, from an application server, the first query directly to the external data source.

4. The method of claim 1, wherein the first data source comprises an external data source, the method further comprising:
    transmitting, from an application server, the first query to a connector for relaying the first query to the external data source.

5. The method of claim 1, wherein the compact form is a query form common to a plurality of query languages corresponding to the plurality of data sources.

6. The method of claim 1, further comprising:
    receiving, at an application server, a request for credentials associated with accessing the first data source.

7. The method of claim 1, further comprising:
    mapping features of a plurality of different query languages into a plurality of groupings, wherein converting the query is based at least in part on the mapping.

8. The method of claim 7, wherein the plurality of groupings comprises columns, groups, name, orders, source filters, aggregate filters, limit, data sources, or a combination thereof.

9. The method of claim 1, wherein the first query is generated at a web browser at the client device.

10. The method of claim 1, wherein the first data source comprises a cloud data source.

11. An apparatus for querying disparate data sources at a user device, comprising:
    a processor,
    memory coupled with the processor; and
    instructions stored in the memory and executable by the processor to cause the apparatus to:
        receive an input request for data from a first data source;
        display, at a user interface of a client device, a compact form to generate queries in a common query language for a plurality of query languages corresponding to a plurality of data sources, the compact form comprising a plurality of query building options available to interact with the first data source associated with the input request;
        receive, via an input to the compact form, a query for data stored at the first data source from the plurality of data sources;
        select a first data connector from a plurality of data connectors, wherein the first data connector corresponds to the first data source;
        identify a first query language corresponding to the first data source from the plurality of query languages;
        convert the query received in the common query language to a first query in the first query language; and
        retrieve the data from the first data source using the first data connector based at least in part on the first query.

12. The apparatus of claim 11, wherein the first data source comprises an internal data source, and the instructions are further executable by the processor to cause the apparatus to:
    transmit, from an application server, the first query directly to the internal data source.

13. The apparatus of claim 11, wherein the first data source comprises an external data source, and the instructions are further executable by the processor to cause the apparatus to:
    transmit, from an application server, the first query directly to the external data source.

14. The apparatus of claim 11, wherein the first data source comprises an external data source, and the instructions are further executable by the processor to cause the apparatus to:
    transmit, from an application server, the first query to a connector for relaying the first query to the external data source.

15. The apparatus of claim 11, wherein the compact form is a query form common to a plurality of query languages corresponding to the plurality of data sources.

16. The apparatus of claim 11, wherein the instructions are further executable by the processor to cause the apparatus to:
    receive, at an application server, a request for credentials associated with accessing the first data source.

17. The apparatus of claim 11, wherein the instructions are further executable by the processor to cause the apparatus to:
    map features of a plurality of different query languages into a plurality of groupings, wherein converting the query is based at least in part on the mapping.

18. The apparatus of claim 17, wherein the plurality of groupings comprises columns, groups, name, orders, source filters, aggregate filters, limit, data sources, or a combination thereof.

19. The apparatus of claim 11, wherein the first query is generated at a web browser at the client device.

20. A non-transitory computer-readable medium storing code for querying disparate data sources at a user device, the code comprising instructions executable by a processor to:
- receive an input request for data from a first data source;
- display, at a user interface of a client device, a compact form to generate queries in a common query language for a plurality of query languages corresponding to a plurality of data sources, the compact form comprising a plurality of query building options available to interact with the first data source associated with the input request;
- receive, via an input to the compact form, a query for data stored at the first data source from the plurality of data sources;
- select a first data connector from a plurality of data connectors, wherein the first data connector corresponds to the first data source;
- identify a first query language corresponding to the first data source from the plurality of query languages;
- convert the query received in the common query language to a first query in the first query language; and
- retrieve the data from the first data source using the first data connector based at least in part on the first query.

\* \* \* \* \*